(12) United States Patent
Harris

(10) Patent No.: US 7,492,566 B2
(45) Date of Patent: Feb. 17, 2009

(54) LOW RESISTANCE TRANSIENT BLOCKING UNIT

(75) Inventor: Richard A. Harris, Palo Alto, CA (US)

(73) Assignee: Bourns, Inc., Riverside, CA (US)

( * ) Notice: Subject to any disclaimer, the term of this patent is extended or adjusted under 35 U.S.C. 154(b) by 215 days.

(21) Appl. No.: 11/332,787

(22) Filed: Jan. 12, 2006

(65) Prior Publication Data
US 2006/0158816 A1 Jul. 20, 2006

Related U.S. Application Data

(60) Provisional application No. 60/677,168, filed on May 3, 2005, provisional application No. 60/644,410, filed on Jan. 14, 2005.

(51) Int. Cl.
H02H 1/00 (2006.01)
H02H 3/20 (2006.01)
H02H 9/04 (2006.01)
H02H 5/04 (2006.01)

(52) U.S. Cl. .............. 361/127; 361/91.1; 361/93.8; 361/103; 361/104; 361/105; 361/106

(58) Field of Classification Search ........... 361/127, 361/91.1, 93.8, 103–106
See application file for complete search history.

(56) References Cited

U.S. PATENT DOCUMENTS

| 3,916,220 | A |   | 10/1975 | Roveti          | 307/251 |
| 4,533,970 | A |   | 8/1985  | Brown           | 361/58  |
| 4,811,156 | A | * | 3/1989  | Kroll           | 361/58  |
| 5,130,262 | A |   | 7/1992  | Masquelier et al. | 437/31 |
| 5,319,515 | A |   | 6/1994  | Pryor et al.    | 361/93  |
| 5,625,519 | A |   | 4/1997  | Atkins          | 361/93  |
| 5,696,659 | A |   | 12/1997 | Maruo           | 361/93  |
| 5,729,418 | A |   | 3/1998  | Lei             | 361/58  |
| 5,742,463 | A |   | 4/1998  | Harris          | 361/88  |
| 5,789,900 | A |   | 8/1998  | Hasegawa et al. | 320/132 |
| 5,929,665 | A |   | 7/1999  | Ichikawa et al. | 327/109 |
| 6,002,566 | A |   | 12/1999 | Arikawa et al.  | 361/93.1 |
| 6,118,641 | A |   | 9/2000  | Atkins et al.   | 361/18  |

(Continued)

FOREIGN PATENT DOCUMENTS

AU      A-75035/91      11/1991

(Continued)

Primary Examiner—Michael J Sherry
Assistant Examiner—Dharti H Patel
(74) Attorney, Agent, or Firm—Lumen Patent Firm

(57) ABSTRACT

A transient blocking unit (TBU) having reduced series impedance is provided. A TBU includes two or more depletion mode transistors arranged to provide a low series impedance in normal operation and a high series impedance when the input current exceeds a predetermined threshold. A nonlinear impedance element is included in the TBU that acts as a current limiter having a substantially constant saturation current over a range of applied voltages. This saturation current is selected to be the threshold current of the TBU. When the threshold is exceeded, the voltage developed across the nonlinear impedance element tends to drive the TBU into its high impedance state. When the operating current is below threshold, the TBU series resistance is relatively low because the nonlinear impedance element is in its low-resistance state. The nonlinear impedance element can be a separate circuit element, or it can be integrated with one or more of the TBU transistors.

9 Claims, 4 Drawing Sheets

U.S. PATENT DOCUMENTS

| | | | |
|---|---|---|---|
| 6,157,529 A | 12/2000 | Ahuja | 361/111 |
| 6,313,610 B1 | 11/2001 | Korsunsky | 320/134 |
| 6,331,763 B1 | 12/2001 | Thomas et al. | 320/136 |
| 6,351,360 B1 | 2/2002 | Kotowski et al. | 361/103 |
| 6,518,731 B2 | 2/2003 | Thomas et al. | 320/136 |
| 6,714,393 B2 | 3/2004 | Nostrand | 361/58 |
| 6,768,623 B1 | 7/2004 | Shen | 361/93.9 |
| 6,855,988 B2 | 2/2005 | Madurawe | 257/347 |
| 6,861,828 B2 | 3/2005 | Watanabe | 323/282 |
| 6,865,063 B2 | 3/2005 | Ball | 361/93.9 |
| 6,914,416 B2 | 7/2005 | Thomas et al. | 320/136 |
| 6,948,078 B2 | 9/2005 | Odaohhara | 713/300 |
| 6,958,591 B1 | 10/2005 | Smith | 320/163 |
| 6,970,337 B2 | 11/2005 | Strahm | 361/58 |

FOREIGN PATENT DOCUMENTS

| | | |
|---|---|---|
| EP | 0818867 | 1/1998 |
| GB | 2294598 | 1/1995 |
| WO | WO95001667 | 1/1995 |
| WO | WO01001539 | 1/2001 |
| WO | WO03069753 | 8/2003 |
| WO | WO2004006408 | 1/2004 |
| WO | WO2004034544 | 4/2004 |

* cited by examiner

LOW RESISTANCE TRANSIENT BLOCKING UNIT

CROSS REFERENCE TO RELATED APPLICATIONS

This application claims the benefit of U.S. provisional applications 60/644,410 filed on Jan. 14, 2005, and 60/677,168 filed on May 3, 2005, both of which are hereby incorporated by reference in their entirety.

FIELD OF THE INVENTION

This invention relates to use of a transient blocking unit (TBU) to protect an electrical load from over-voltage and/or over-current conditions.

BACKGROUND

Many circuits, networks, electrical devices and data handling systems are operated in configurations and environments where external factors can impair their performance, cause failure or even result in permanent damage. Among the most common of these factors are over-voltage and over-current. Protection against these factors is important and has been addressed in the prior art in various ways.

Fuses that employ thermal or magnetic elements are one common protection measure. In other cases, protection circuits are available. Some examples are described in U.S. Pat. Nos. 5,130,262; 5,625,519; 6,157,529; 6,828,842 and 6,898,060. Protection circuits are further specialized depending on conditions and application. For example, in the case of protecting batteries or rechargeable elements from overcharging and over-discharging one can refer to circuit solutions described in U.S. Pat. Nos. 5,789,900; 6,313,610; 6,331,763; 6,518,731; 6,914,416; 6,948,078; 6,958,591 and U.S. Published Application 2001/00210192. Still other protection circuits, e.g., ones associated with power converters for IC circuits and devices that need to control device parameters and electric parameters simultaneously also use these elements. Examples can be found in U.S. Pat. Nos. 5,929,665; 6,768,623; 6,855,988; 6,861,828.

When providing protection for very sensitive circuits, such as those encountered in telecommunications the performance parameters of the fuses and protection circuits are frequently insufficient. A prior art solution embodied by transient blocking units (TBUs) that satisfy a number of the constraints is considered in international publications PCT/AU94/00358; PCT/AU04/00117; PCT/AU03/00175; PCT/AU03/00848 as well as in U.S. Pat. Nos. 4,533,970; 5,742,463 and related literature cited in these references.

In a TBU, two or more transistors are arranged such that they normally provide a low series resistance. However, when an over-voltage or over-current transient is applied to the TBU, the transistors switch to a high impedance current blocking state, thereby protecting a load connected in series to the TBU. Variations and/or refinements of the basic TBU concept are considered in U.S. Pat. Nos. 3,916,220, 5,319,515, 5,625,519, 5,696,659, 5,729,418, 6,002,566, 6,118,641, 6,714,393, 6,865,063, and 6,970,337

In conventional TBU operation, the terminal voltages necessary to drive the TBU into its high impedance state are generated by the flow of current through the TBU transistors. Once these terminal voltages reach a predetermined threshold level (typically on the order of 1 V), the TBU switches to its current blocking state. The current required to bring the voltage to this level is the TBU trigger current. This feature of conventional TBU operation has undesirable consequences in certain cases. More specifically, an undesirably high TBU series resistance is required in cases where a low TBU trigger current is required. For example, a conventional TBU having a trigger current of 30 mA will need a series resistance of about 30Ω in order to switch a TBU having a voltage threshold of about 1 V. In normal operation, the 30Ω TBU series resistance undesirably increases power dissipation without providing any benefits. A conventional TBU having a 1Ω series resistance and a 30 mA trigger current would require a voltage threshold on the order of 30 mV, which is impractically low. It is apparent that the series resistance of a conventional TBU undesirably increases as the TBU trigger current decreases, since practical voltage thresholds cannot be substantially less than about 1 V.

Thus it would be an advance in the art to provide TBUs having reduced series resistance, especially in cases where the TBU trigger current is low.

SUMMARY

According to the invention, a nonlinear impedance element is included in a TBU that acts as a current limiter having a substantially constant saturation current over a range of applied voltages. This saturation current is selected to be the threshold current of the TBU. When the threshold is exceeded, the voltage developed across the nonlinear impedance element tends to drive the TBU into its high impedance state. When the operating current is below threshold, the TBU series resistance is relatively low because the nonlinear impedance element is in its low-resistance state. TBU series resistance is thereby reduced. The nonlinear impedance element can be a separate circuit element, or it can be integrated with one or more of the TBU transistors.

DETAILED DESCRIPTION

Figure 1:
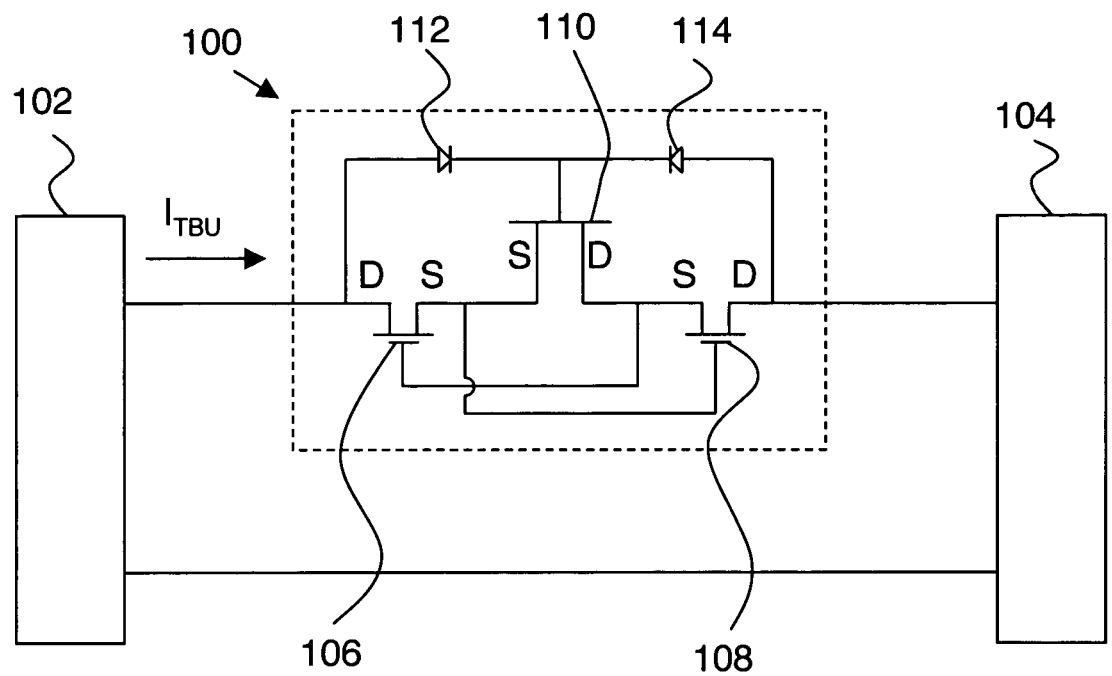
FIG. 1 shows a conventional bipolar transient blocking unit.

FIG. 1 shows a conventional bipolar transient blocking unit (TBU). In the arrangement of FIG. 1, a TBU 100 is disposed in series between an electrical source 102 and an electrical load 104. In ordinary operation, TBU 100 provides a low impedance and has a negligible effect on the operation of load 104 as driven by source 102. However, if a current through TBU 100 exceeds a predetermined value $I_{out}$, the TBU rapidly switches to a high impedance state, effectively disconnecting load 104 from source 102. This rapid and automatic disconnection of load 104 from source 102 protects load 104 from over-current or over-voltage conditions that can occur in the output of source 102.

The basic principle of TBU operation is to pass the TBU current $I_{TBU}$ through one or more normally on transistors (e.g., depletion mode transistors). The transistors are connected such that the voltage drops generated by the flow of $I_{TBU}$ tend to turn off the transistors. As a result of this positive feedback, when $I_{TBU}$ exceeds $I_{out}$ the TBU switches to a high impedance state, thereby protecting the load. The threshold current $I_{out}$ can be set to a predetermined value by appropriate design. There are various ways to connect the TBU transistors to provide this functionality. For example, FIGS. 1 and 2 show bipolar and unipolar TBU circuits respectively.

Figure 2:
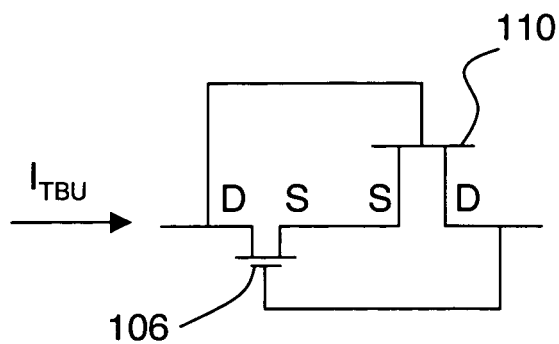
FIG. 2 shows a conventional unipolar transient blocking unit.

Conventional TBU operation is best appreciated by beginning with the unipolar example of FIG. 2. The circuit of FIG. 2 has a depletion mode n-channel NMOS transistor 106 (Q1) and a depletion mode p-channel JFET 110 (Q2). The source of Q1 is connected to the source of Q2, the gate of Q1 is connected to the drain of Q2, and the drain of Q1 is connected to the gate of Q2. The TBU input is the drain of Q1 and the TBU output is the drain of Q2. As $I_{TBU}$ flows through Q1 and Q2, corresponding source-drain voltage drops V1 and V2 are generated. The gate to source voltage for Q2 is V1 and the gate to source voltage for Q1 is V2. As the gate to source voltages for Q1 and Q2 increase, V1 and V2 also tend to increase (since Q1 and Q2 are depletion mode devices), and this self-reinforcing feedback drives the TBU to a high impedance state when $I_{TBU}$ exceeds the threshold $I_{out}$.

The example of FIG. 2 is a unipolar TBU in the sense that it will act to block transients having a particular polarity (i.e., the polarity that tends to switch Q1 and Q2 off). Transients having the opposite polarity are not blocked by the circuit of FIG. 2. Bipolar protection can be provided by providing two TBUs as in FIG. 2 in series, one designed to block positive transients and the other designed to block negative transients. A more efficient alternative for bipolar protection is shown in the example of FIG. 1.

The circuit of FIG. 1 includes an n-channel depletion mode input NMOS transistor 106 (Q1), a p-channel JFET 110 (Q2) and an n-channel depletion mode output NMOS transistor 108 (Q3). The source of Q1 is connected to the source of Q2, the gate of Q1 is connected to the drain of Q2, the drain of Q1 is connected to the gate of Q2 via an input diode 112, the source of Q3 is connected to the drain of Q2, the gate of Q3 is connected to the source of Q2, and the drain of Q3 is connected to the gate of Q2 via an output diode 114. As $I_{TBU}$ flows through Q1, Q2 and Q3, corresponding source-drain voltages V1, V2 and V3 are generated. Diodes 112 and 114 act to ensure that only one of Q1 and Q3 is coupled to the gate of Q2 (depending on the polarity of the transient being blocked). Thus for positive transients, Q1 and Q2 act together to block the transient (as in the circuit of FIG. 2), while for negative transients, Q2 and Q3 operate in this manner. Alternatively, the roles of Q1 and Q3 with respect to transient polarity can be exchanged.

As indicated above, selection of the threshold current $I_{out}$ in a conventional TBU is performed by selecting a TBU series resistance R such that $RI_{out}$ is on the order of a typical transistor switching voltage (i.e., on the order of 1 V). Thus, conventional TBUs suffer from the disadvantage that their series resistance R increases as the threshold current $I_{out}$ decreases. For example, as indicated above, a conventional 30 mA TBU will have a series resistance on the order of 30Ω.

Figure 3:
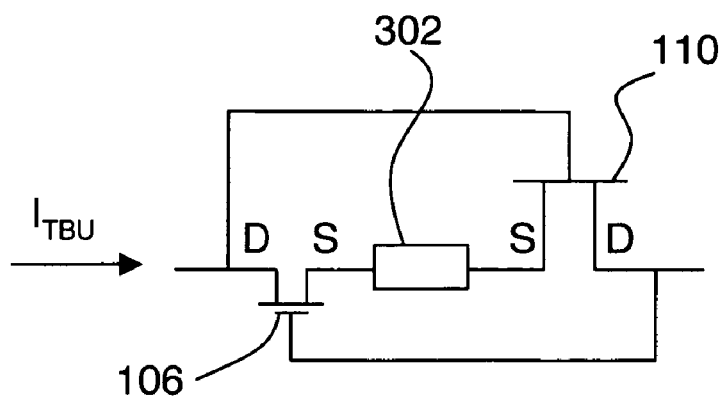
FIG. 3 shows a transient blocking unit according to a first embodiment of the invention.

FIG. 3 shows an embodiment of the present invention that addresses this series resistance problem of conventional TBUs. The TBU of FIG. 3 differs from the conventional TBU of FIG. 2 in that a nonlinear impedance element 302 is disposed between the source of transistor 106 and the source of transistor 110. A typical schematic of a suitable nonlinear impedance element 302 is shown on FIG. 4, which is a transistor having its gate connected to its source (or to its drain).

Nonlinear impedance element 302 acts as a current source, in the sense that the current through element 302 is substantially equal to a saturation current $I_s$ for a range of applied voltages. For example, the I-V response of FIG. 5 (which is provided by the circuit of FIG. 4) is a suitable I-V response for practicing the invention, where the current saturates at $I_s$ for applied voltages greater than a saturation voltage $V_s$ and less than a breakdown voltage (not shown). Nonlinear impedance element 302 can be any element or combination of elements that provides such a current source I-V response. Many suitable circuits and elements for providing such a response will be apparent to an art worker.

In operation, the saturation current of nonlinear impedance element 302 is selected to be equal to the desired TBU threshold current. When the TBU current is less than the threshold, the nonlinear impedance element is in a low resistance state, so the overall TBU series resistance in this operating mode can be quite low (e.g., on the order of 1Ω). When the TBU current exceeds the threshold, the voltage across nonlinear impedance element 302 increases significantly, since this element acts as a current limiter. The voltage developed across element 302 contributes to the gate voltages of transistors 106 and 110 to drive the TBU into its high impedance, current blocking state.

In this manner, a low threshold current TBU (e.g., having a threshold current of 30 mA) can also have a low series resistance (e.g., about 1Ω), in sharp contrast to conventional TBU designs. In the present invention, nonlinear impedance element 302 generates the voltages necessary to switch off the TBU transistors, while in a conventional TBU, these voltages are generated by the series resistance of the TBU transistors. Thus the invention entails decoupling the generation of the TBU transistor switching voltages from the series resistance of the TBU transistors by provision of the nonlinear impedance element. This design flexibility can be exploited to provide low threshold current TBUs having low series resistance, as in the preceding example.

Figure 6:
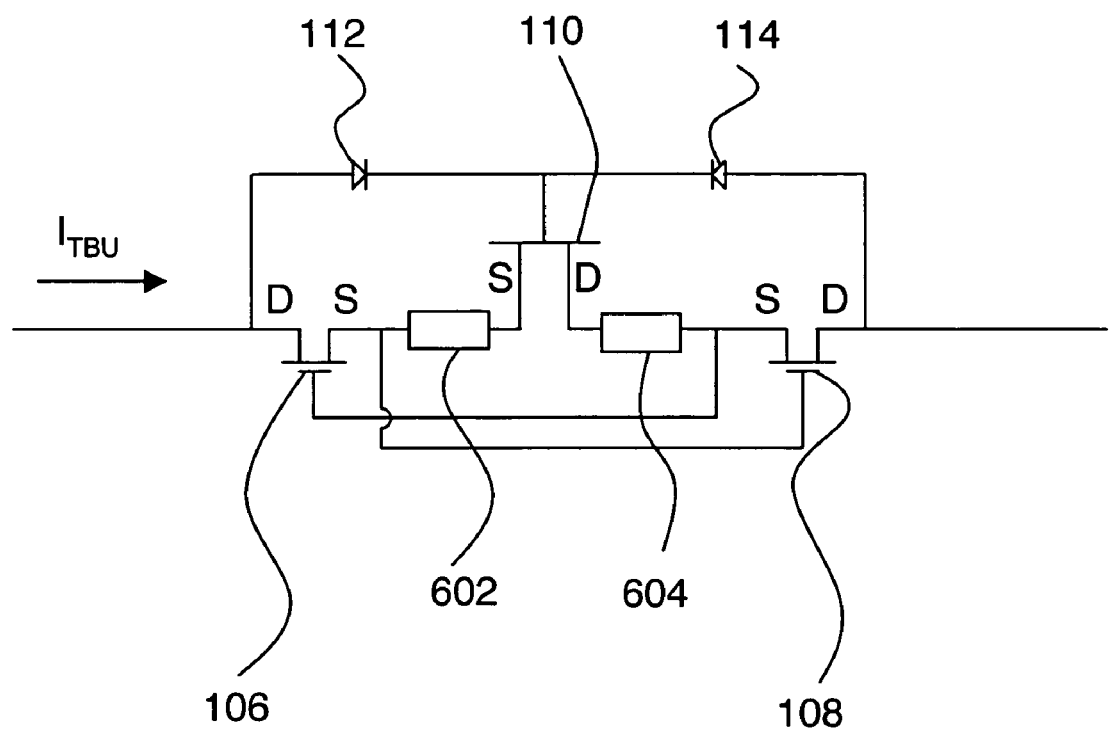
FIG. 6 shows a transient blocking unit according to a second embodiment of the invention.

The TBU of FIG. 3 is a unipolar TBU. The invention is also applicable to bipolar TBUs, as shown on FIG. 6. Here nonlinear impedance elements 602 and/or 604 are disposed as shown (i.e., in series between transistors 106 and 110 and/or in series between transistors 110 and 108) such that the voltages across elements 602 and 604 contribute to the gate voltages of transistors 106, 108, and 110.

Figure 4:
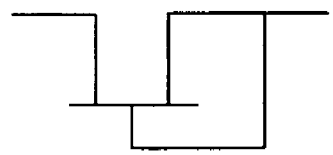
FIG. 4 shows a nonlinear impedance element suitable for use in embodiments of the invention.
Figure 5:
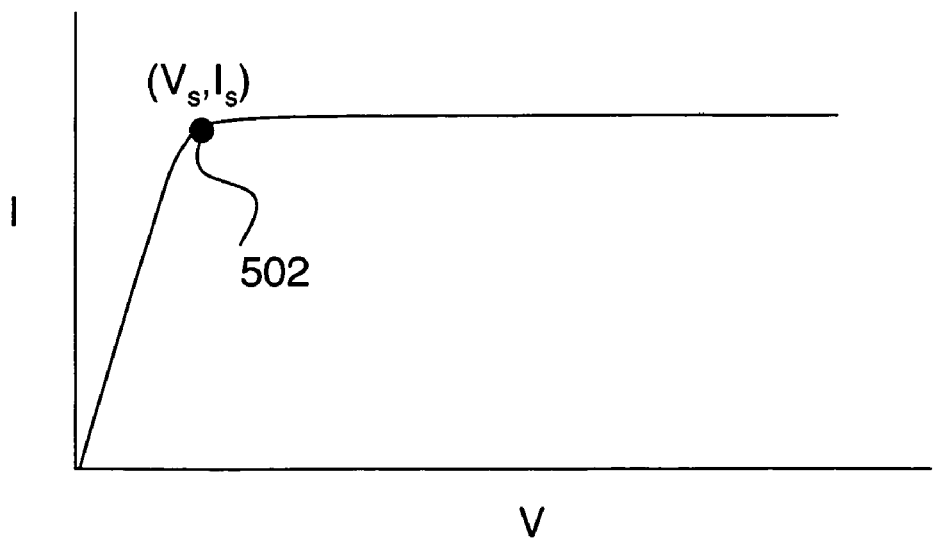
FIG. 5 shows a typical unipolar I-V response of a nonlinear impedance element suitable for use in embodiments of the invention.
Figure 7:
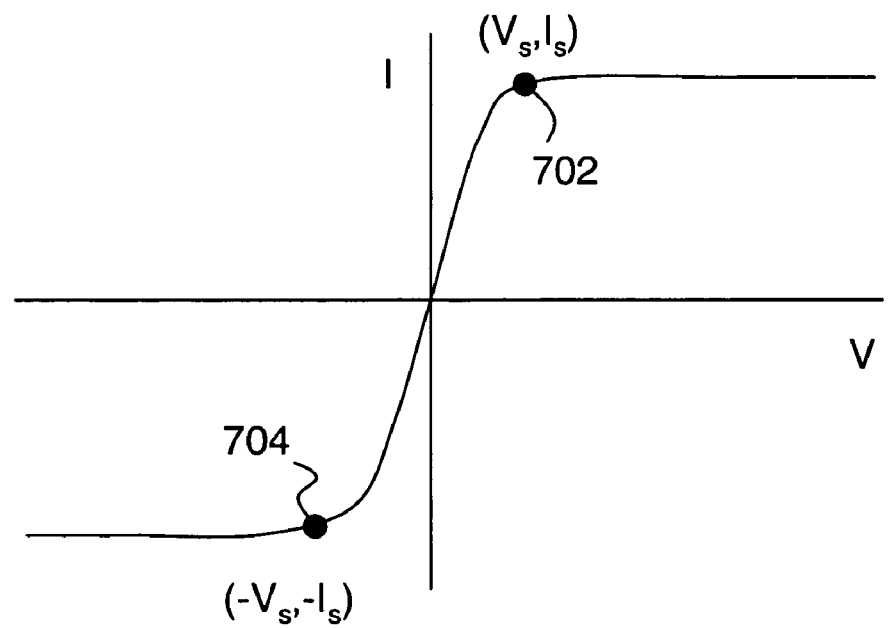
FIG. 7 shows a typical bipolar I-V response of a nonlinear impedance element suitable for use in embodiments of the invention.

In general, nonlinear impedance elements are bipolar if they act as current limiters for both positive and negative currents (e.g., as shown on FIG. 7), and unipolar if they only act as current limiters for one current polarity (e.g., as shown on FIG. 5). A unipolar nonlinear impedance element typically provides an approximately linear and low resistance for currents having the "wrong" polarity for current limiting. Thus a bipolar nonlinear impedance element can be constructed by placing two circuits as in FIG. 4 in series in a back to back configuration, such that one circuit limits positive currents and the other circuit limits negative currents. Many other ways of making bipolar nonlinear impedance elements will be apparent to an art worker, all of which are also suitable for practicing the invention.

For unipolar TBUs, as in FIG. 4, it is preferred (but not required) for nonlinear impedance element 302 to also be unipolar, for simplicity. Bipolar TBUs as in FIG. 6 can employ either unipolar nonlinear impedance elements or bipolar nonlinear impedance elements. For example, elements 602 and 604 can both be unipolar nonlinear impedance elements having the appropriate polarity. Alternatively, if a bipolar nonlinear impedance element is employed, only a single such element is needed (i.e., element 602 or element 604, but not both). Thus the circuit of FIG. 6 can include both elements 602 and 604 (if they are unipolar) or it can include only one of elements 602 and 604 if the included element is bipolar.

Figure 8A:
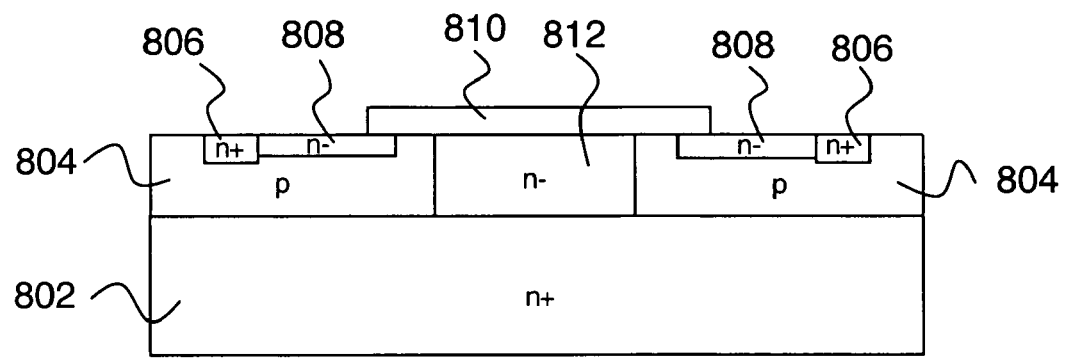
FIGS. 8a-b show integrated nonlinear impedance elements suitable for use in embodiments of the invention.
Figure 8B:
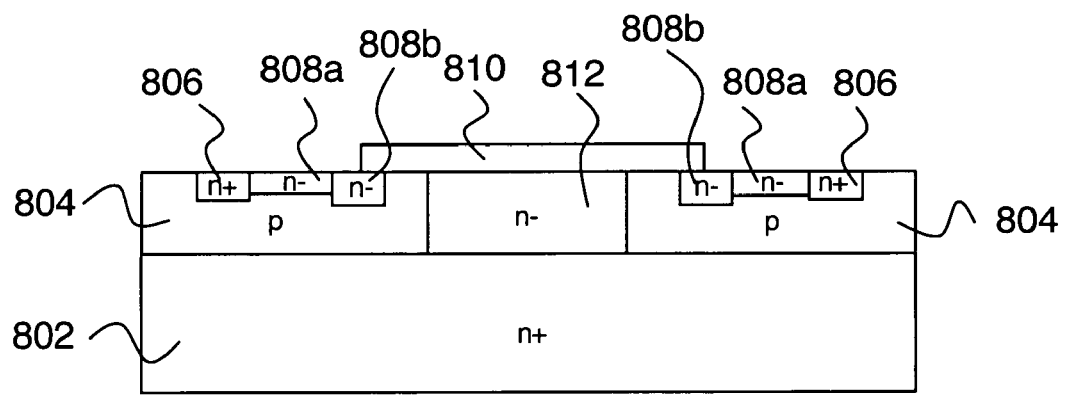

FIGS. 8a-b show alternative embodiments of the invention where the nonlinear impedance element is integrated with a TBU transistor. FIG. 8a shows a TBU transistor having source regions 806, a gate 810, a drain 812 and channel regions 804 on a substrate 802. The source regions are separated from the channel by separate channel segments 808. Such separate channel segments can act as nonlinear impedance elements as described above, and accordingly are suitable for practicing the invention. More specifically, channel segments 808 have I-V responses having a saturation current (e.g., as shown on FIG. 5), and this channel segment saturation current is selected by design to be the same as the desired TBU trigger current. Operation of a TBU including the transistor of FIG. 8a is as described above in connection with FIG. 3 or FIG. 6.

FIG. 8b shows an embodiment of the invention similar to the embodiment of FIG. 8a, except that channel segments 808 on FIG. 8a are replaced with multiple channel subsegments 808a-b on FIG. 8b. The design flexibility provided by having multiple channel subsegments can be exploited to provide improved control of the channel segment saturation current and/or TBU series resistance. Such multiple channel subsegments can be regarded as a discrete approximation to a continuously graded channel segment, which is also suitable for practicing the invention.

The preceding description of the invention is by way of example as opposed to limitation. Thus the invention can be practiced according to many variations of the above embodiments. For example, reduced resistance TBUs can make use of any kind of depletion mode transistor, such as N or P channel MOSFETs, N or P channel JFETs, static induction transistors, or any other kind of field effect transistor. Although NMOS input and output transistors in combination with a p-channel JFET is preferred, any combination of transistor types is suitable for practicing the invention.

The preceding description refers to various field effect transistors having a source, gate and drain for specificity. It is well known in the art that many field effect transistors are symmetric with respect to their source and drain, in the sense that these connections can be exchanged without substantially altering device or circuit operation. Such transistors often have their source and drain terminals designated with "D/S". For the bipolar TBU embodiment of FIG. 6, it is preferred for JFET 110 to be a symmetric FET (although NMOS transistors 106 and 108 are typically not symmetric). The source and drain terminals in the preceding examples can be exchanged in cases where symmetric transistors are employed. In view of this possibility, the preceding examples giving specific source and drain connections are to be understood as also being examples of connections to first and second FET channel terminals, where the first and second channel terminals can be source and drain respectively, or can be drain and source respectively.

The invention claimed is:

1. An apparatus for electrical transient blocking comprising:
    a transient blocking unit including at least one n-channel depletion mode device and at least one p-channel depletion mode device, wherein the depletion mode devices are connected such that an applied electrical transient alters a bias voltage $V_p$ of said depletion mode p-channel device and alters a bias voltage $V_n$ of said depletion mode n-channel device to block the transient by switching off the depletion mode devices; and
    one or more nonlinear impedance elements, wherein each nonlinear impedance element is a two-terminal nonlinear impedance element, whereby the nonlinear impedance element is connected in series with and between channels of two of the depletion mode devices;
    wherein each nonlinear impedance element has an I-V response such that a current through the impedance element is substantially equal to a saturation current $I_s$ for a range of applied voltages.

2. The apparatus of claim 1, wherein at least one of said nonlinear impedance elements is integrated with one of said depletion mode devices as a separate channel segment.

3. The apparatus of claim 2, wherein said separate channel segment comprises multiple channel subsegments.

4. The apparatus of claim 2, wherein said separate channel segment is graded.

5. The apparatus of claim 1, wherein said nonlinear impedance elements are selected from the group consisting of unipolar nonlinear impedance elements, bipolar nonlinear impedance elements, and transistors having a gate connected the transistor's source or the transistor's drain.

6. The apparatus of claim 1, wherein said transient blocking unit is a unipolar transient blocking unit.

7. The apparatus of claim 6, wherein said transient blocking unit comprises an input n-channel depletion mode NMOS transistor (Q1) and a p-channel depletion mode JFET (Q2), wherein Q1 and Q2 each have a first channel terminal, a gate and a second channel terminal, and wherein the first channel terminal of Q1 is connected to the first channel terminal of Q2, the gate of Q1 is connected to the second channel terminal of Q2, and the second channel terminal of Q1 is connected to the gate of Q2.

8. The apparatus of claim 7, wherein said nonlinear impedance elements comprise a unipolar nonlinear impedance element connecting the first channel terminal of Q1 to the first channel terminal of Q2.

9. A method for electrical transient blocking comprising:
    providing a transient blocking unit including at least one n-channel depletion mode device and at least one p-channel depletion mode device, wherein the depletion mode devices are connected such that an applied electrical transient alters a bias voltage $V_p$ of said depletion mode p-channel device and alters a bias voltage $V_n$ of said depletion mode n-channel device to block the transient by switching off the depletion mode devices;
    providing one or more nonlinear impedance elements, wherein each nonlinear impedance element is a two terminal nonlinear impedance element, whereby the nonlinear impedance element is connected in series with and between channels of two of the depletion mode devices;
    wherein each nonlinear impedance element has an I-V response such that a current through the impedance element is substantially equal to a saturation current $I_s$ for a range of applied voltages.

* * * * *